July 9, 1963  G. H. PRIMEAU ETAL  3,096,994
CASTER AND CAMBER ADJUSTMENT MEANS
Filed Aug. 24, 1959  2 Sheets-Sheet 1
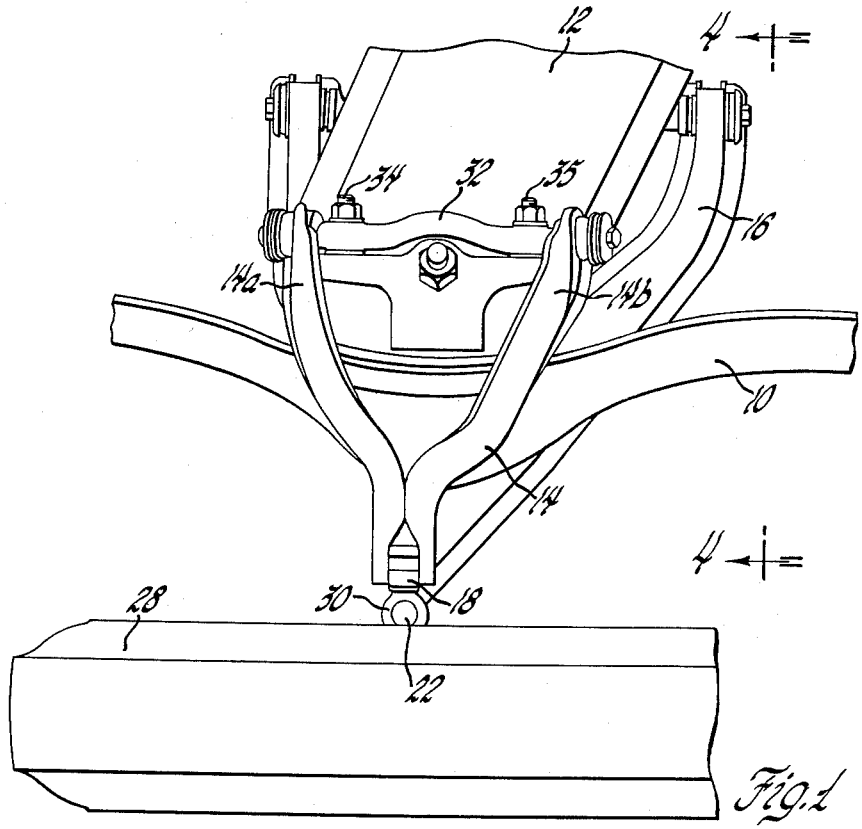
INVENTORS
George H. Primeau &
BY William S. Wolfram
Bryce Beecher
ATTORNEY

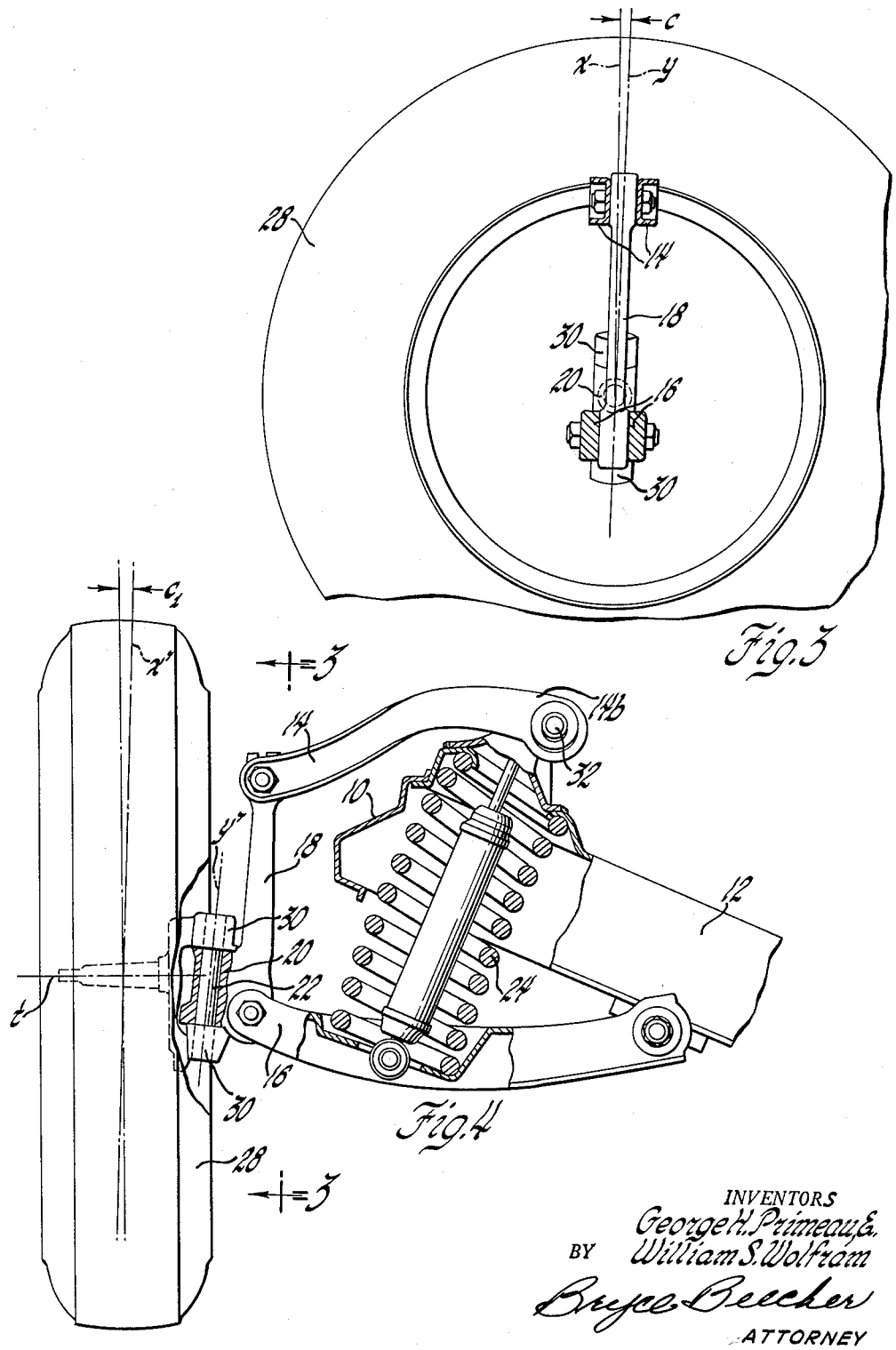

United States Patent Office 3,096,994
Patented July 9, 1963

3,096,994
CASTER AND CAMBER ADJUSTMENT MEANS
George H. Primeau, Grosse Pointe Farms, and William S. Wolfram, Birmingham, Mich., assignors to General Motors Corporation, Detroit, Mich., a corporation of Delaware
Filed Aug. 24, 1959, Ser. No. 835,513
5 Claims. (Cl. 280—96.1)

This invention relates to automotive vehicles, and more particularly concerns means for effecting caster and camber adjustment of the dirigible wheels of such vehicles.

As well understood in the art, caster is the angle measured in degrees that the steering knucle pivots are tilted forward or backward from the vehicle when viewed from the side. The introduction of caster is advantageous in that it facilitates return of the dirigible wheels to a straight-ahead position after a turn has been made. Generally speaking, the caster in the modern vehicle varies from one-half to three degrees.

Wheel camber is the angle made by the dirigible wheel (viewed from the front or rear) with relation to the vertical when the wheel is in the straight-ahead position. The direction of the canting or tilting is always such that the cambered wheels are closer together at the bottom than at the top. In recent years, due to improved roads having less crown, the amount of camber employed has been substantially reduced, a camber of not more than about 1% being now generally recommended. Even assuming a perfectly flat roadway, some camber is considered essential to compensate for deflection of the axle or axle equivalent under the load of the vehicle.

Heretofore, the adjustments in caster and camber have been effected through the use of shims, one or more of which are employed as necessary to achieve the desired angulations. This practice introduces the factor of human error both as regards the number of shims selected and the installation of the shims. Essentially, the procedure is one of trial and error and a really fine or precise adjustment is a rarity.

As suggested, the present invention has as its principal object to provide a scheme which is less subject to human error and which enables the attainment of more exact adjustments.

Other objects and features will become apparent from the following description of a preferred embodiment of the invention, the same being illustrated by the accompanying drawings wherein:

FIGURE 1 is a fragmentary plan showing a suspension assembly of the type to which the invention is applicable;

FIGURE 2 is a fragmentary elevation illustrating the nature of the connection between the parts through which the adjustments are attained, certain of the parts or portions thereof being shown in section or broken away;

FIGURE 3 is a view on the line 3—3 in FIGURE 4; and

FIGURE 4 is a view on the line 4—4 in FIGURE 1.

Referring first to FIGURE 1, the numeral 10 denotes a frame side rail component, 12 a bracket which is also a part of the over-all vehicle framing.

Bracket 12 provides pivotal support for an upper control arm 14 and a lower control arm 16. These arms are interconnected at their outward ends (FIGURES 1 and 4) by a vertically disposed steering knuckle arm 18 comprising a knuckle 20 through which the king pin 22 is passed. A coil spring 24 is shown as the elastic component of the suspension assembly. Outward of the control arms a dirigible wheel 28 will be seen as carrying lugs 30 spaced for the accommodation of the knuckle 20, the lugs being centrally bored to receive the ends of the king pin 22.

The pivotal connection between the upper control arm 14 and the frame member 12 is made through a shaft 32 which journals the ends of the portions 14a and 14b and which is fixedly connected to the frame member 12 by means of bolts 34, 35 each of which is provided with a nut 36, 37 secured against loosening by a lock washer 38, 39.

The two points of fixed connection between the shaft member 32 and the frame member 12 afford a convenient place for effecting the caster and camber adjustments deemed desirable. Thus, assuming the distances $s_1$ and $s_2$ in FIGURE 2 are equal and give a condition of zero caster, in order to obtain the positive caster adjustment shown in FIGURE 3, such adjustment being represented by the space $c$ between the vertical line $x$ and the center line $y$ of the king pin 22, it is only necessary to increase distance $s_1$ a predeterminable amount since, as should be apparent, this has the effect of rotating the king pin center line clockwise.

That the camber adjustment of the dirigible wheels is also a function of the spacing between the shaft 32 and the frame member 12 should be clear from FIGURE 4 where $c_1$ is the camber angle, line $x'$ is perpendicular to the ground level, line $t$ is the center line of wheel 28 and line $y'$ the center line of the king pin 22. Thus, again taking spaces or distances $s_1$ and $s_2$ in FIGURE 2 as equal and assuming that the spacing between the shaft and frame member accords with a condition of zero camber, to introduce camber $c_1$ it is required only that distances $s_1$ and $s_2$ be decreased the appropriate amount.

It has been the practice heretofore, as previously explained, to control the spaces $s_1$ and $s_2$ by applying shims between the shaft 32 and the frame member. Now in accordance with the invention, the use of shims is dispensed with and the spacing controlled by the means illustrated by FIGURE 2. In such figure, 40 denotes volute springs which at assembly are inserted in recesses 42 formed in the underside of the shaft member 32. With the volute springs 40 so placed and with the same held in the recesses by frictional engagement with the walls thereof, the shaft member 32, using suitable fixtures, is brought into juxtaposition with the frame member 12, whereafter the bolts 34 and 35 are applied with tightening of the nuts 36, 37 to an extent such that the undersides of the bolt heads and the undersides of the washers 38, 39 just contact the adjacent surfaces of the frame member and shaft.

It is to be observed that each bolt 34, 35 has therein an axial bore 46 and a radial bore 48 opening to the axial bore. Thus, following the making of the described light or loose connection between the shaft and frame member, there is introduced into the chambers delineated by the volute springs 40 via the communicating bores 46 and 48 a fluid or plastic substance adapted to cure to a hard, tough state. With the chambers filled with the plastic substance, nuts 36, 37 are further tightened on the corresponding bolts to achieve the exact spacing desired between the shaft 32 and the frame member 12, the excess plastic being squeezed out of the chambers via the route of the passage 48, 46.

The hardening or solidifying of the plastic substance may occur naturally by reason of the nature of the substance or may be brought about as by heat or the application of some other condition. In any event, it is to be understood that the invention is not predicated on the use of any particular material. As an example of a suitable material may be mentioned the pasty mixture sold under the trade name "Devcon" and described as comprised of 80% powdered steel and 20% chemical plastic. When such mixture is applied with a suitable catalyst, it hardens in about two hours, without heat or pressure, to a rigid steel-like mass.

As has perhaps been suggested, the term "plastic" is not used herein in the strict chemical sense, but as referring to any material suited for the described purpose. There are doubtless certain metals or metal alloys of the type used in typography, for instance, which melt at a reasonably low temperature and which in their solid state are possessed of the required properties.

What is claimed is:

1. In the assembly of an independent front suspension of the type comprising a frame member, a shaft member fixedly connected to said frame member and a control arm pivoted on said shaft member, the improvement which resides in making the fixed connection by a process which involves: bringing said members into juxtaposition, interposing a volute spring therebetween, effecting a light connection between said members by means including a bolt the shank of which is passed axially through said volute spring and is formed to provide a fluid passage opening to the chamber delineated by the spring, filling said chamber through said passage with a curable plastic material, tightening the said light connection to an extent providing a predetermined space between said members, said space being gauged in relation to the caster and camber characteristics desired in the suspension assembly, and subjecting the plastic material to conditions causing it to set.

2. In the assembly of an independent front suspension of the type comprising a frame member, a shaft member fixedly connected to said frame member and a control arm pivoted on said shaft member, the improvement which resides in making the fixed connection by a process which involves: bringing said members into juxta-position, interposing a collapsible cup-like element therebetween, effecting a light connection between said members by means including an element having a shank-like portion which is passed axially through said cup-like element and is formed to provide a fluid passage opening to the chamber delineated by said last element, filling said chamber through said passage with a plastic substance, tightening the said light connection to an extent providing a predetermined space between said members, said space being gauged in relation to the caster and camber characteristics desired in the suspension assembly, and subjecting the plastic substance to conditions causing it to set.

3. In an independent front suspension assembly, a frame member, a control member comprising spaced arm portions, a shaft member to which each of said arm portions is pivotally connected, said shaft member being fixedly connected to said frame member at spaced points mediate the points of pivotal connection of said arm portions, the fixed connections being made through single plastic shims of thicknesses predetermined in relation to the caster and camber characteristics desired in the assembly, each said shim being directly surrounded by container means, said container means being per se expensible and contractible.

4. In an independent front suspension assembly, a frame member, a control member comprising spaced arm portions, a shaft member to which each of said arm portions is pivotally connected, said shaft member being fixedly connected to said frame member at two spaced points, each of said points being adjacent one of said first-mentioned pivotal connections, the said fixed connections being made through single plastic shims of thicknesses predetermined in relation to the caster and camber characteristics desired in the assembly, said shims each being directly surrounded by a volute spring.

5. In an independent front suspension assembly, a frame member, a control member comprising a pair of spaced arm portions, a shaft member to which each of said arm portions is pivotally connected, said shaft member being fixedly connected to said frame member at two spaced points mediate the points of pivotal connection of said arm portions, the fixed connections being made by means including a pair of bolts extending through single plastic shims spacing said shaft member and said frame member and determining the caster and camber characteristics of the assembly, said shims each being directly surrounded by a volute spring, said volute springs being accommodated in part in recesses formed in said shaft member.

References Cited in the file of this patent
UNITED STATES PATENTS

| | | |
|---|---|---|
| 1,344,417 | Lovekin | June 22, 1920 |
| 2,372,849 | Phelps | Apr. 3, 1945 |
| 2,678,853 | Reeder | May 18, 1954 |
| 2,772,596 | Trussell | Dec. 4, 1956 |
| 2,795,412 | Waisner | June 11, 1957 |
| 2,850,331 | Curry et al. | Sept. 2, 1958 |